(12) United States Patent
Webster et al.

(10) Patent No.: US 7,627,286 B2
(45) Date of Patent: Dec. 1, 2009

(54) BEAMFORMING SYSTEMS AND METHODS

(76) Inventors: Mark Webster, 139 Island View Dr., Indian Harbor Beach, FL (US) 32937; Deniz Rende, 7570 Greenboro Dr. Apt. 5, West Melbourne, FL (US) 32904; Daniel Shearer, 11652 E. Dell Timbre Dr., Scottsdale, AZ (US) 85259

( * ) Notice: Subject to any disclaimer, the term of this patent is extended or adjusted under 35 U.S.C. 154(b) by 347 days.

(21) Appl. No.: 11/410,707

(22) Filed: Apr. 25, 2006

(65) Prior Publication Data

US 2006/0270352 A1    Nov. 30, 2006

Related U.S. Application Data

(60) Provisional application No. 60/674,838, filed on Apr. 25, 2005.

(51) Int. Cl.
*H04B 7/185* (2006.01)
*H04B 7/212* (2006.01)

(52) U.S. Cl. .......... 455/13.3; 455/562.1; 455/575.7; 455/121; 455/129; 455/193.1; 370/347

(58) Field of Classification Search .......... 455/13.3, 455/562.1, 575.7, 121, 129, 193.1; 370/347
See application file for complete search history.

(56) References Cited

U.S. PATENT DOCUMENTS

| | | | | |
|---|---|---|---|---|
| 5,530,449 | A * | 6/1996 | Wachs et al. | 342/174 |
| 5,929,804 | A * | 7/1999 | Jones et al. | 455/13.3 |
| 6,320,540 | B1 * | 11/2001 | Meredith | 342/377 |
| 6,784,831 | B1 * | 8/2004 | Wang et al. | 342/357.12 |
| 6,895,230 | B1 * | 5/2005 | Blount et al. | 455/276.1 |
| 7,132,979 | B2 * | 11/2006 | Langenberg | 342/368 |
| 7,183,974 | B1 * | 2/2007 | Minkoff | 342/377 |
| 2003/0050016 | A1 * | 3/2003 | Boros et al. | 455/67.4 |
| 2004/0127260 | A1 | 7/2004 | Boros et al. | |

OTHER PUBLICATIONS

International Search Report, mailed May 29, 2007.

* cited by examiner

*Primary Examiner*—Thang V Tran
*Assistant Examiner*—Huy D Nguyen
(74) *Attorney, Agent, or Firm*—McDonnell Boehnen Hulbert & Berghoff LLP

(57) ABSTRACT

Systems and methods of convergence beamforming are disclosed. One method embodiment, among others, comprises receiving N data streams from at least N+1 antennas, where N is an integer greater than 1; determining signal characteristics of each received data stream; and adjusting the signal characteristics of N data streams to be transmitted based on the determined signal characteristics of the received N data streams. The convergence beamforming may be achieved by the orthogonalization of received multipath channel vectors. The transmission signals from a station are adjusted corresponding to the channel characteristics of the signals received by that station.

21 Claims, 8 Drawing Sheets

BEAMFORMING SYSTEMS AND METHODS

CROSS-REFERENCE TO RELATED APPLICATION

This application claims priority to U.S. provisional application having Ser. No. 60/674,838, filed Apr. 25, 2005, which is entirely incorporated herein by reference.

TECHNICAL FIELD

The present disclosure is generally related to digital communications and, more particularly, is related to methods and systems for auto-convergence multiple-input multiple-output (MIMO) beam-forming.

BACKGROUND

Communication networks come in a variety of forms. Notable networks include wireline and wireless. Wireline networks include local area networks (LANs), digital subscriber line (DSL) networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (WLAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. IEEE 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

The 802.11a standard defines data rates of 6, 12, 18, 24, 36 and 54 Mbps in the 5 GHz band. Demand for higher data rates may result in the need for devices that can communicate with each other at the higher rates, yet co-exist in the same WLAN environment or area without significant interference or interruption from each other, regardless of whether the higher data rate devices can communicate with the 802.11a devices. It may further be desired that high data rate devices be able to communicate with the 802.11a devices, such as at any of the standard 802.11a rates.

One challenge in designing a wireless transmission system involves transmit beamforming using an antenna array. Beamforming focuses signals toward a receiver in such a way that they combine at the receiver resulting in a stronger signal. If signals are transmitted off multiple antennas and focused toward a designated receiver rather than being transmitted in an omni-directional fashion, the composite phase and amplitude of the transmission determines the effectiveness of the beam-forming. The phase and amplitude relationship between the transmit antennas is adjusted to focus this energy at the intended receiver. One way to adjust a beam-forming transmitter is to incorporate additional circuitry on the radio. The circuitry is used to compute and share the conditions observed by the receiver. The transmitter then performs a complex calculation to adjust the beamforming antenna array. However, this solution can be expensive.

Increasing the effective signal strength and/or receiver sensitivity enables more efficient communications. Increased signal strength may enable service providers to more effectively use their equipment. Consumers may realize a cost savings as well.

SUMMARY

Embodiments of the present disclosure provide systems and methods for beam-forming.

One embodiment of the present disclosure can be viewed as providing methods for autoconvergence beam-forming. In this regard, one embodiment of such a method, among others, can be broadly summarized by the following steps: receiving N data streams from at least N+1 antennas, where N is an integer greater than 1; determining signal characteristics of each received data stream; and adjusting the signal characteristics of N data streams to be transmitted based on the determined signal characteristics of the received N data streams.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of beamforming systems and methods. Such embodiments adjust the characteristics of a signal to be transmitted. One system embodiment comprises a processor that determines the amplitude and phase vectors of signals transmitted through a multipath transmission channel. Adjustments of the signal characteristics may be done in any type of processor such as a PHY layer processor, though not limited to a PHY layer processor, including, but not limited to, a digital signal processor (DSP), a microprocessor (MCU), a general purpose processor, and an application specific integrated circuit (ASIC), among others.

A new standard is being proposed, referred to as IEEE 802.11n (the "802.11n proposal"), which is a high data rate extension of the 802.11a standard at 5 gigahertz (GHz) and 802.11g at 2.4 GHz. Both of these standards use orthogonal frequency division multiplexing (OFDM), which is a signaling scheme which uses multiple, parallel tones to carry the information. These tones are commonly called subcarriers. It is noted that, at the present time, the 802.11n proposal is only a proposal and is not yet a completely defined standard. Other applicable standards include Bluetooth, xDSL, other sections of 802.11, etc. To increase the data rate, 802.11n is considering using multiple input multiple output (MIMO) functionality which uses multiple transmit and receive antennas.

Figure 1:
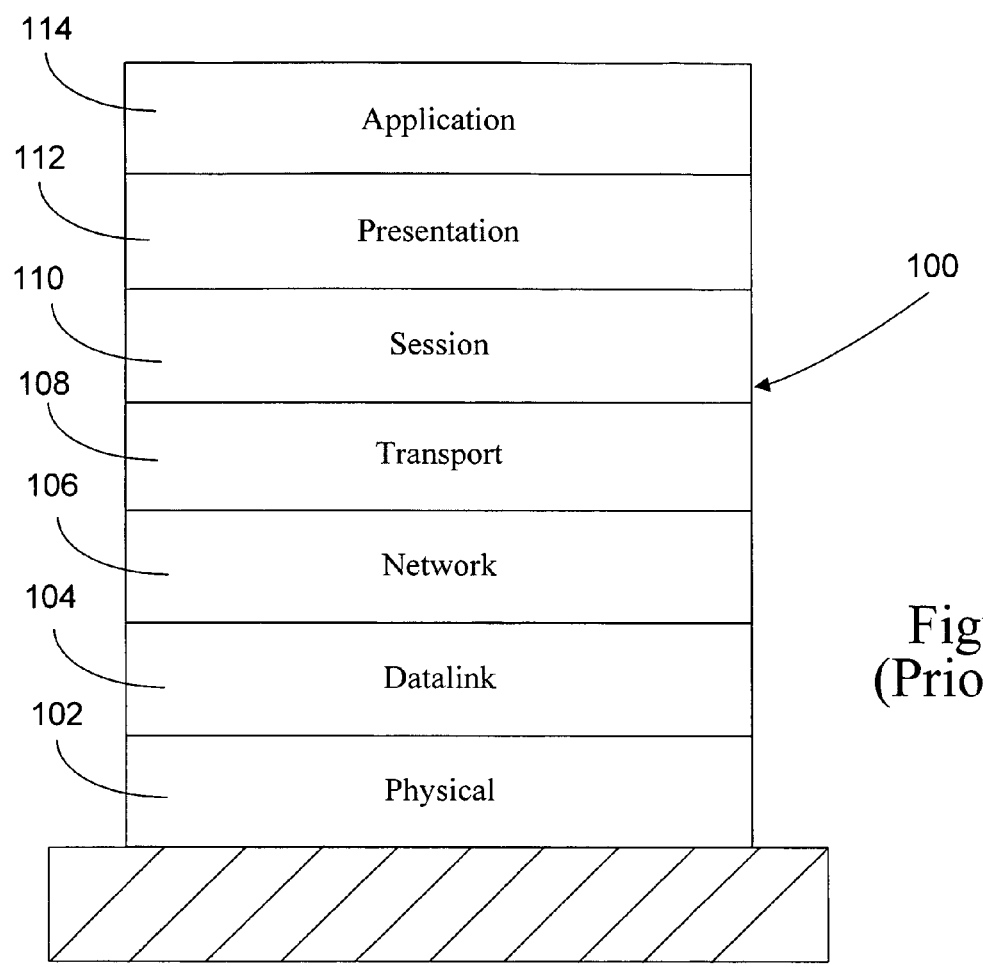
FIG. 1 is a block diagram of an open system interconnection (OSI) layered model for data transmission.

IEEE 802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer. FIG. 1 shows a diagrammatic representation of an open systems interconnection (OSI) layered model 100 developed by the International Organization for Standards (ISO) for describing the exchange of information between layers in communication networks. The OSI layered model 100 is particularly useful for separating the technological functions of each layer, and thereby facilitating the modification or update of a given layer without detrimentally impacting on the functions of neighboring layers.

At a lower most layer, the OSI model 100 has a physical layer or PHY layer 102 that is responsible for encoding and decoding data into signals that are transmitted across a particular medium. Above the PHY layer 102, a data link layer 104 is defined for providing reliable transmission of data over a network while performing appropriate interfacing with the PHY layer 102 and a network layer 106. The network layer 106 is responsible for routing data between nodes in a network, and for initiating, maintaining and terminating a communication link between users connected to the nodes. A transport layer 108 is responsible for performing data transfers within a particular level of service quality. A session layer 110 is generally concerned with controlling when users are able to transmit and receive data. A presentation layer 112 is responsible for translating, converting, compressing and decompressing data being transmitted across a medium. Finally, an application layer 114 provides users with suitable interfaces for accessing and connecting to a network.

Figure 2:
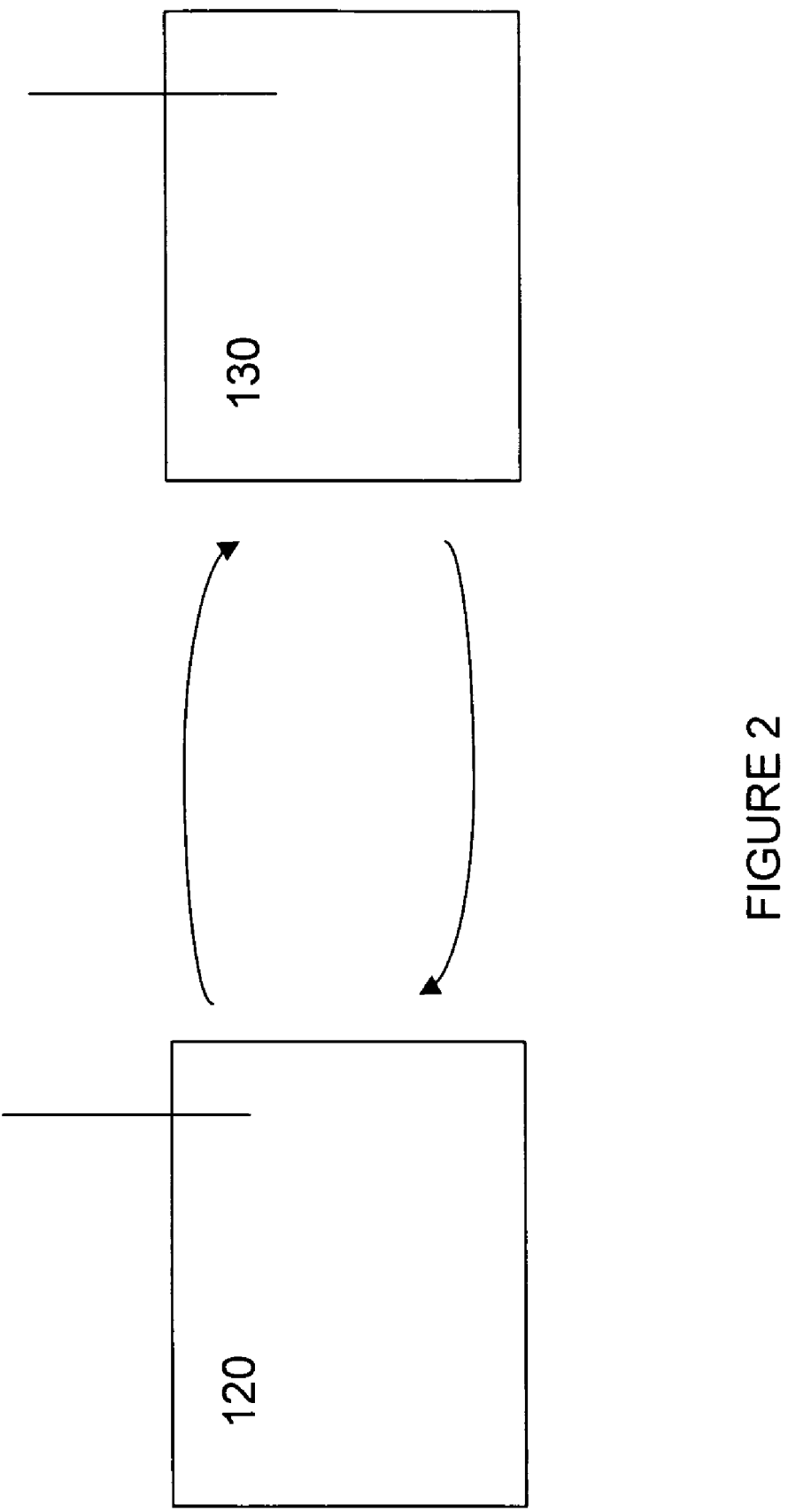
FIG. 2 is a system diagram of two stations using the OSI model of FIG. 1.

This OSI model 100 can be useful for transmissions between, for example, two stations, 120, 130 as shown in FIG. 2. Stations 120, 130 may comprise a digital communication system, which may include transceivers for transmitting and receiving data streams between stations 120, 130. Stations 120, 130 may include multiple antennas for receiving and/or transmitting. Stations 120, 130 do not necessarily have the same number of antennas. Stations 120, 130 may transmit using a time division multiple access (TDMA) protocol.

Exemplary embodiments of the beamforming method for a transceiver can be processed in a PHY signal processor. A PHY signal processor is configured to perform functionality of the preferred embodiments. A digital communication system may comprise such a processor, alone, or in combination with other logic or components. A system of communications may further be embodied in a wireless radio, or other communication device. Such a communication device may include many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc. A Media Access Controller (MAC) Protocol enables the exchange of channel information between stations. A station 120, 130 may adjust the amplitude and phase of a transmission signal to achieve orthogonal data signals. In general, a transmit channel introduces phase errors and amplitude attenuations. To adjust for the phase errors and amplitude attenuations in a beam-forming system, described below, a ping-pong technique is employed in which a first station 120 adjusts signal characteristics of a transmission signal intended for a second station 130 based on the signal characteristics of a received signal from the second station 130.

There are many ways to use multiple transmit antennas to send data between two stations 120, 130. In one method, transmit energy is blindly sent in all directions. In another method, the energy of the transmit antennas is focused so that one signal is maximized at the receiver. This is called "beamforming." This beamforming method is utilized in a "ping-pong" method described hereinbelow. Additionally, first station 120 can beamform multiple data streams so that the power that second station 130 receives is maximized for each signal. Here, instead of transmitting one signal from multiple antennas, multiple signals can be transmitted from multiple antennas simultaneously. Through the multipath channel, multiple signals can be sent simultaneously or substantially simultaneously in the same spectrum at the same station to exploit the properties of the multipath. For example, two separate signals can be received at a station simultaneously if both stations 120, 130 have a sufficient number of antennas. As the multiple signals are transmitted, part of the transmitted energy may bounce off of objects and the station receives those signals with different amplitudes and phases, or different signal characteristics.

With multiple receiver antennas the receive signals are received in a stereo type receiver. Because the signals have passed along different routes, they arrive at the multiple receive antennas with different amplitudes and phases. The station performs a function, which may be called a "signal separation." Because the two signals are sent simultaneously, they interfere with each other at the receive antennas. However, because one signal comes in slightly weaker on a specific antenna then another signal and is received with a slightly different phase shift, the receiving station can differentiate between those signals using a packet's preamble. The signal characteristics of a signal may be included in a preamble of packets of a data stream configured according to a protocol such as IEEE 802.11 when the station is able measure signal characteristics, such as the amplitude and phase of the signals among others, sent from each transmit antenna. Using the information contained in the preamble, the receiver can determine the mathematical properties of the transmission channel. The mathematical properties of the channel can be modeled with a matrix. By inverting the matrix and applying it to the received signals the orthogonal components of the received signals can be determined. This is called signal separation at a receiver of the multiple data signals. For OFDM, this process is repeated for each subcarrier.

In beamforming with one signal, for example, if the transmitter is informed of the signal characteristics that the transmitted signal has when it arrives at the receiver for each transmit antenna, the phase and amplitude of those transmitted signals can be adjusted such that when they arrive at the receive antennas, they combine coherently. If there are multiple transmit antennas available, multiple data streams, or multiple signals, can be transmitted from those multiple antennas. If N signals are transmitted, at least N+1 antennas are used to focus the energy of the N signals. The signal from each transmit antenna of one of station 120, 130 propagates to each receive antenna of the other of station 120, 130 with a particular amplitude, which can be represented by a complex coefficient. The complete set of coefficients for all the transmit antennas and receive antennas can be represented by a matrix called the channel matrix. Each of the transmit antenna to receive antenna transmission channels embodies a complex coefficient which describes those channel characteristics. If there are, as a non-limiting example, four transmit antennas and two receive antennas, each transmit signal from a particular transmit antenna arrives at both of the receive antennas, and there is a corresponding complex coefficient for the transmission channel from the transmit antennas to the receive antennas. For OFDM, each subcarrier has a corresponding channel matrix.

The channel matrix, in this non-limiting example of four transmit antennas and two receive antennas can be written as a matrix, which has a dimension of two by four. The matrix can be mathematically decomposed to determine how to adjust the vectors to maximize the transmission energy received at the receiver. One method that may be used to determine the matrix is for the station 120 to transmit a sounding packet, which allows the station 130 to measure the channel. Once the channel has been measured, the information is transmitted back to station 120 in a packet. This is called explicit beamforming, since the channel is explicitly computed by station 130 and transferred to the transmit beamformer of station 120. Station 120 may then perform a mathematical algorithm on the information, in the form of a matrix, to decompose said matrix to determine how to beamform each individual signal to be transmitted to station 130.

In one beamforming method embodiment, two signals are sent back and forth (ping-pong) between two stations to determine the channel characteristics. By performing a mathematical algorithm on these signals, a similar solution may be derived to act as if station 130 explicitly measured the phase shift and sent it back to station 120. An exemplary embodiment incorporates reciprocal beamforming. With reciprocal beamforming, the same frequencies are used in both directions (transmitting from station 120 to station 130 and reciprocating a transmission from station 130 to station 120), and the same antennas are used for both transmit and receive functionality. An exemplary embodiment may also incorporate a MIMO antenna array for transmitting and receiving two or more substantially simultaneous signals sharing the same frequency bands (OFDM subcarrier frequencies).

Unlike the ping-pong method, with explicit MIMO beam forming, a station uses a complete multipath channel estimate to focus the transmitted signals to the other station. The matrix representation of this channel estimate describes the channel characteristics such as the amplitude and phase shift of the path from each transmit antenna to each receive antenna. A sounding packet may be used such that the station may determine the signal characteristics of the multipath channel from each antenna. This extra sounding packet and explicit relay of channel information from station 120 to station 130 is inefficient. Also, the channels, in general, change in time due to movement of either station 120 or station 130, or both. Each time the channel changes sufficiently, the sounding packet process is repeated and the information concerning the multipath channel is transmitted back between stations 120, 130 so that the amplitude and phase changes can be compensated for. Once the channel information is received at stations 120, 130, a complex mathematical algorithm, namely a matrix decomposition, is run to understand the mathematical properties of the channel to enable accurate beamforming to the receiver.

This sounding packet is unnecessary in the preferred embodiments. By ping-ponging, or transmitting signals back and forth through the channel, the signals that are transmitted through the channels can be beamform tuned. Since the channel may dynamically vary, the natural transmitting back and forth between stations 120, 130 is used to track the channel dynamics, providing constant illumination of the channel characteristics in the process. For explicit beamforming, the mathematical decomposition of the channel involved in processing the sounding packet is called a matrix "singular value decomposition" (SVD). SVD is a decomposition of a matrix if the matrix is not square. If station 120 has four antennas and station 130 has two antennas, for example, the decomposition matrix of the channel is two by four. If the matrix is square, an eigen value decomposition may be performed on the matrix. As will be disclosed below in detail, since the sounding packet is not used in the ping-pong method, an SVD is not required, yet the converged result is the same. If the channel characteristics are dynamically changing, every time a ping-pong transmission occurs, the channel characteristics are illuminated in the process. Each signal may be represented by one spatial stream of transmissions. If multiple antennas are available, more than one signal may be sent through the multipath, supporting more than one spatial stream.

A first property of the ping-pong method may be described as follows. In transmitting multiple signals simultaneously on multiple antennas, station 120 maps one signal across the transmit antennas with a transmit vector. Station 120 then maps a second signal across the transmit antennas using a second vector. If station 120 uses an SVD transmit beam-forming solution (ping) to start, then the channel vector that station 130 sees for each transmit signal is equal to the conjugate of the optimum SVD transmit vectors station 130 should use when transmitting back (pong). The ping-pong method, therefore, may use the receive vectors for N signals to define N transmit beamforming vectors. The receive vectors are often called MRC (maximal ratio combining) vectors. These transmit beamforming vectors will be the optimum SVD solution for the transmitter of station 130. The ping-pong method does not require that the SVD solution be explicitly computed. Rather, by exploiting a second property, described below, the ping-pong method employs an orthogonality constraint which provides automatic convergence to the SVD solution when ping-ponged.

By ping-ponging back and forth, stations 120, 130 converge to send signals in both directions through the dominant multipath, thereby beam forming the signals. As the channel changes, the channel naturally filters the signal such that only the strongest multipath is received. By ping-ponging back and forth, stations 120, 130 automatically track these channel changes. Stations 120, 130 can then use the channel characteristics that are determined from the receive packet (MRC vectors) and turn around and transmit using those corresponding characteristics (beamforming vectors). After convergence, on the receive signal, the receiver of station 120 observes the optimum vectors associated with the channel. If station 120 takes the observed received amplitude and phase shift multipath vectors and conjugates them, the resultant vectors may be used to transmit back to station 130. Station 130 does not need to know whether it is converged; it merely uses the same algorithm continually.

A second property may be described as follows. In transmitting multiple signals substantially simultaneously on multiple antennas, the transmitter maps one signal across the transmit antennas with the transmit vector. It then maps a second signal across the transmit antennas using a second vector. If the transmitter uses the SVD transmit beamforming solution, when the signals arrive at a receiver, they arrive orthogonal and the receive MRC vectors are orthogonal. For the ping-pong method, the station uses the receive vectors (MRC vectors) conjugated to form the transmit beamform vectors, only the station forces the transmit vectors to be orthogonal. This may be called the orthogonality constraint. The ping-pong method employs two steps to provide automatic convergence. First, the receive vectors are used to determine the transmit vectors. Second, the second transmit vector for the second signal (the next strongest received signal) is orthogonalized to the first transmit vector for the first signal (the strongest received signal).

Figure 3:
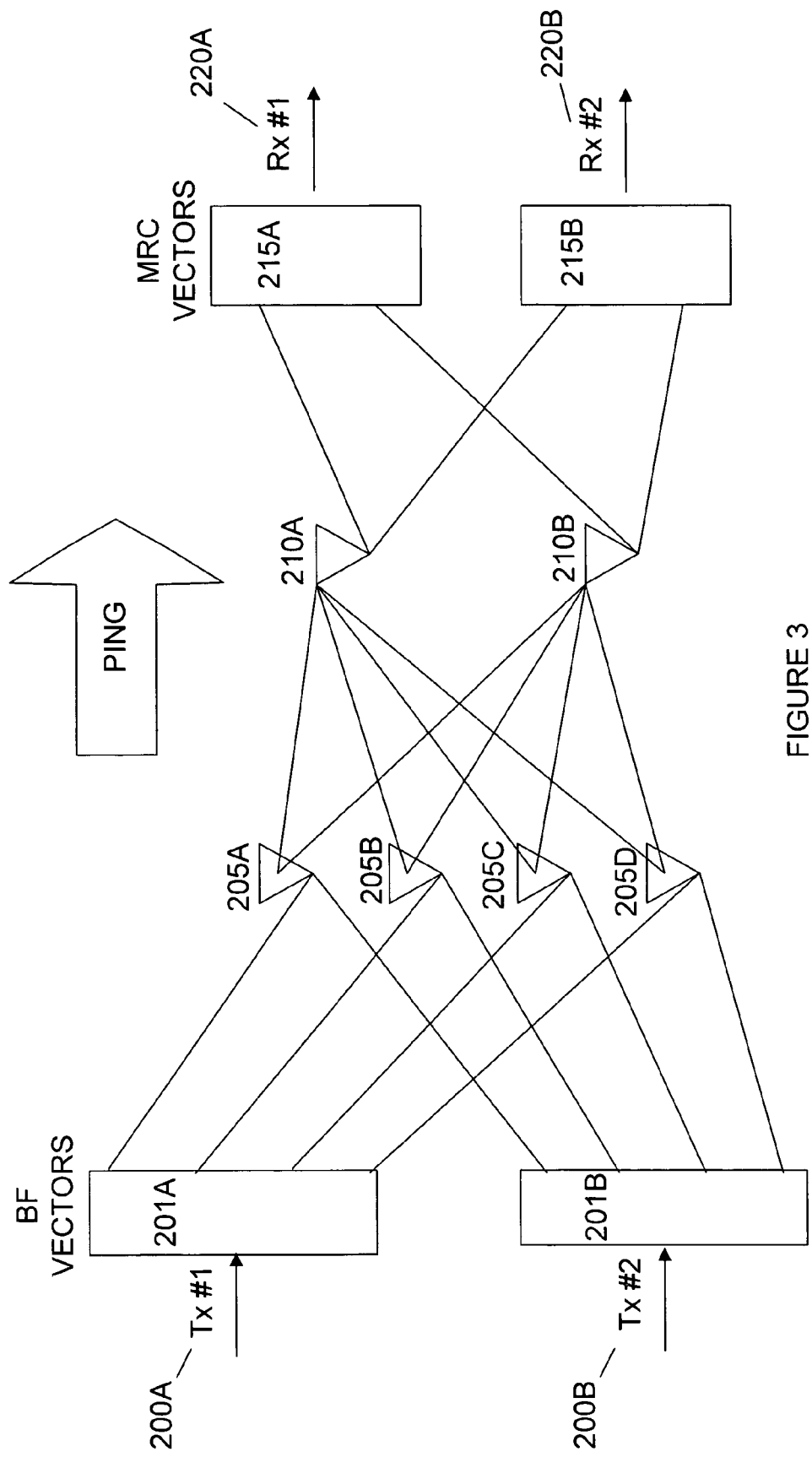
FIG. 3 is a block diagram of a multiple input multiple output (MIMO) transmission on the stations of FIG. 2.

Referring now to FIG. 3, when multiple signals are transmitted substantially simultaneously through the multipath channel, the channel characteristics may be represented by complex coefficients. The mathematics of the process can be illustrated by performing an SVD decomposition of the multipath channel to extract vectors from a received signal at station 120. Station 120 will then use the extracted vectors to adjust the first signal 200A and route it to all the transmit antennas 205A-205D of station 120. Each transmitted signal from station 120 will have its amplitude and phase shift adjusted before sending to each antenna 205A-205D of station 120. Likewise, the second vector from the SVD decomposition is used to map the second signal 200B that is transmitted to each of the four antennas 205A-205D of station 120. When the vector-weighted signals pass through the multipath channel, they arrive at the multiple receive antennas 210A-210D of station 130. The receiver of station 130 then performs a decomposition of the receive matrix to determine vectors 215A, 215B. Station 130 then applies the conjugate of those vectors to signals to be transmitted from station 130. After applying the conjugate of the vectors to the signals to be transmitted, the signals to be transmitted are orthogonal to each other. By automating this compensation process, the efficiency of the beamforming method can be greatly improved. Using this ping-pong behavior, even if a transmission is initiated with incorrect channel characteristics, it will converge to the proper channel characteristics.

Figure 4:
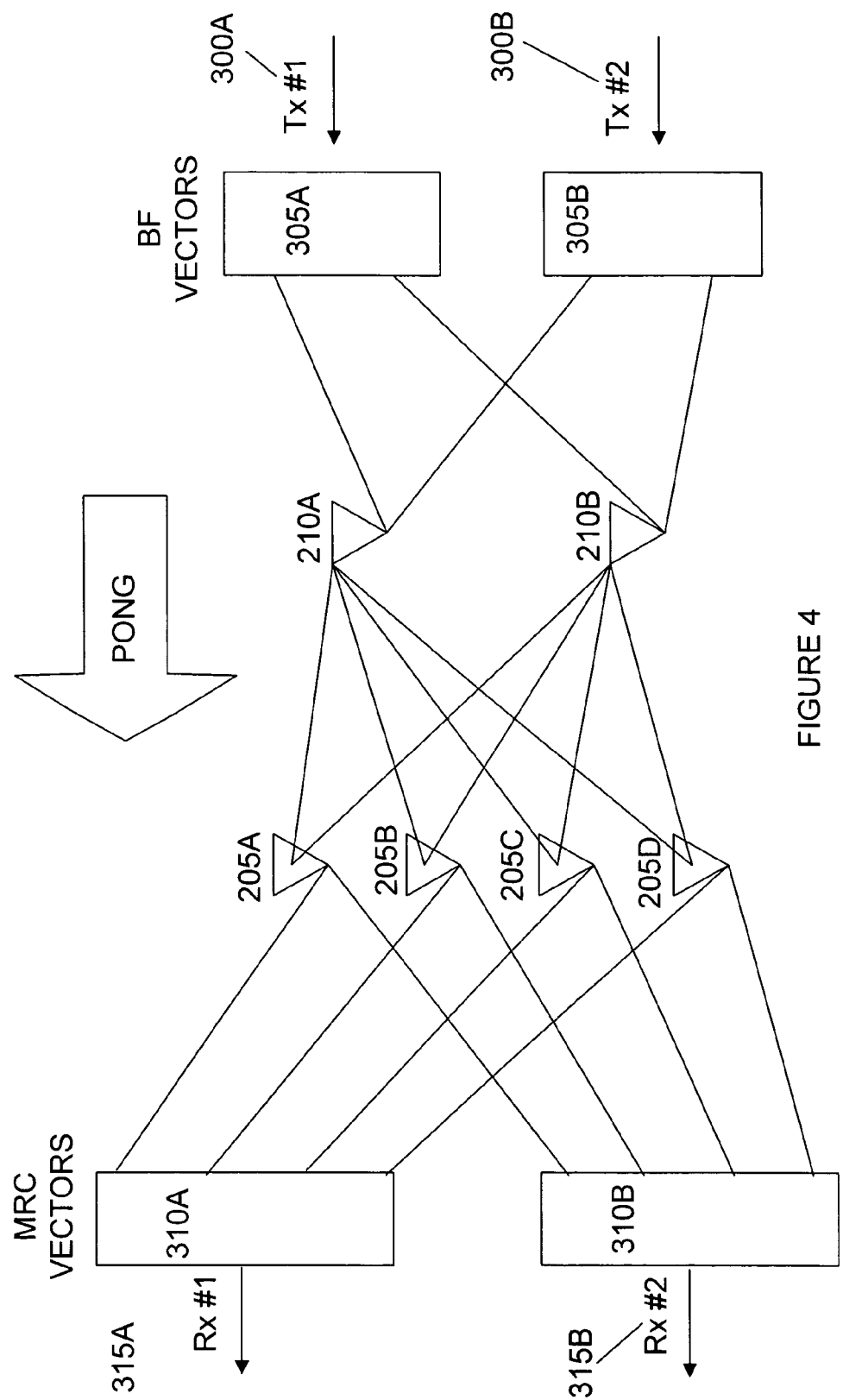
FIG. 4 is a block diagram of a reciprocating configuration of the stations of FIG. 2.

Referring to FIG. 4, the adjusted vectors 300A, 300B are applied to data streams 300A, 300B in station 130. Each of the adjusted data streams is then sent to each of transmission antennas 210A, 210B of station 130 to be transmitted through the multipath channel. The signals are received on antennas 205A-205D of station 120 where they are separated into received signals 315A, 315B. MRC vectors 310A, 310B are determined through decomposition and are orthogonalized for preparation for a return transmission.

Figure 5:
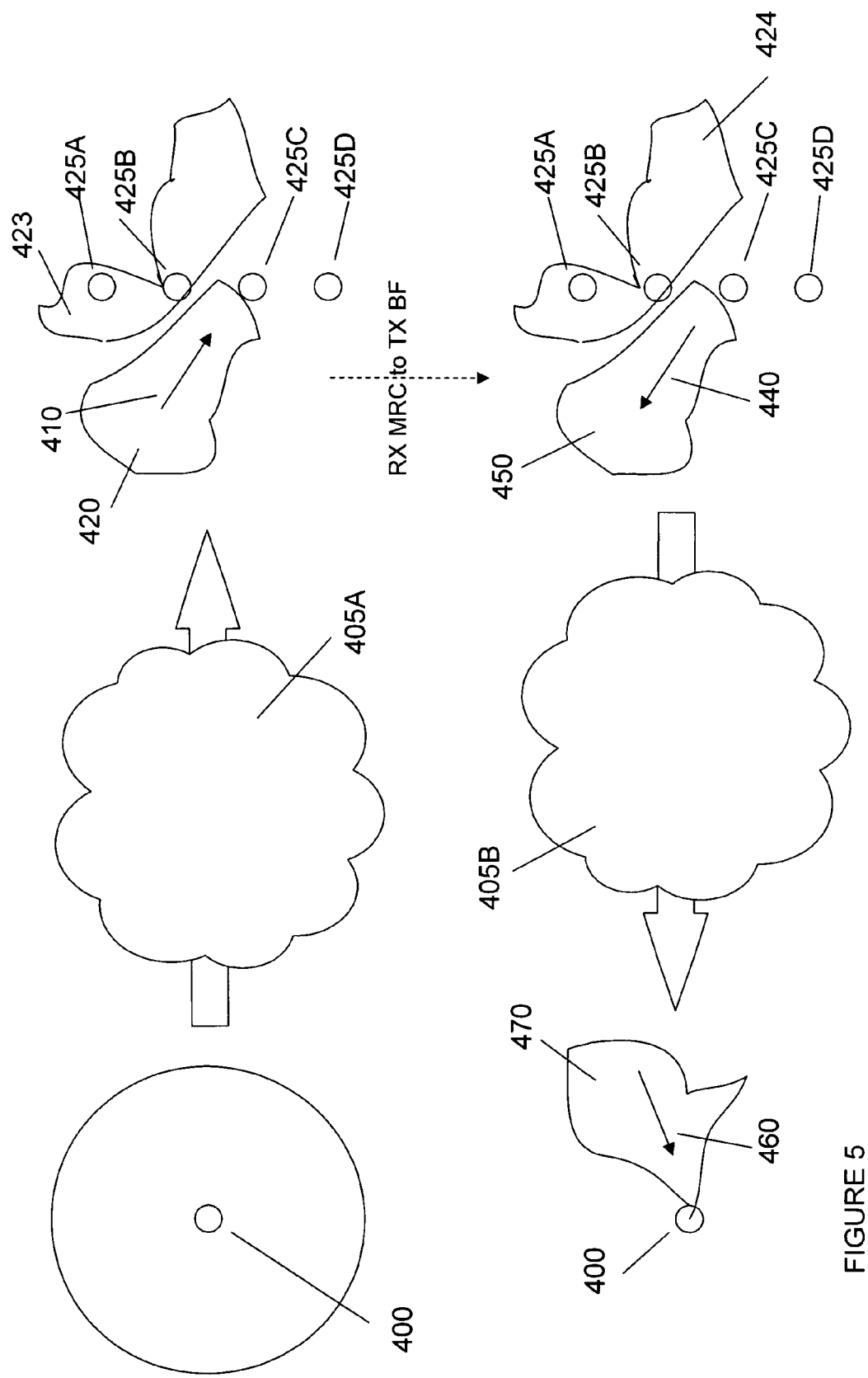
FIG. 5 is a schematic diagram of a "ping-pong" transmission of one data stream where one station has exactly one antenna.

Referring to FIG. 5, to demonstrate the autoconvergence property, a single signal is transmitted on a single antenna 400 of station 120. Station 120 transmits the packet, which is radiated in all directions. Some of energy 410 gets transferred through multipath 405A and arrives at receive antennas 425A-425D of station 130 with directivity. The received energy 410 comes from a particular direction. The direction of this received energy 410 is an optimal solution for this case. Received energy 410 is instantly converged; no ping-ponging back and forth is required. If the received energy 410 arrived at station 130 from a direction that bounced off structures in the channel, for instance, the optimum way that it can transmit that same energy 440 from antennas 425A-425D back to station 120 that has only one antenna 400 is to transmit energy 440 using the same paths 405B that it saw on the reception. This behavior of a channel is called "reciprocal." The direction of the received energy corresponds to the amplitude and phase shift of the signal. So, when the station 120 receives energy 460 with singular antenna 400, energy 460 arrives with a particular amplitude and a particular phase shift. When station 130 using multiple transmit antennas 425A-425D transmits energy 440 back to station 120 with one receive antenna 400, station 130 should generate the same amplitudes and opposite phase shifts corresponding to the conjugate of the received matrix. Energy 460 that arrives at station 130 will be maximized in power. Elements 420 and 423 represent the angle of arrival (AOA) of the multipath energy as a function of azimuth for the ping. Elements 424 and 450 represent the angle of departure (AOD) of the transmit beamforming energy (reciprocal) for the pong. Element 470 represents the AOA for the pong. If the AOA 420, 423 and AOD 424, 450 are the same for a station, the transmit beamforming has converged.

Figure 6:
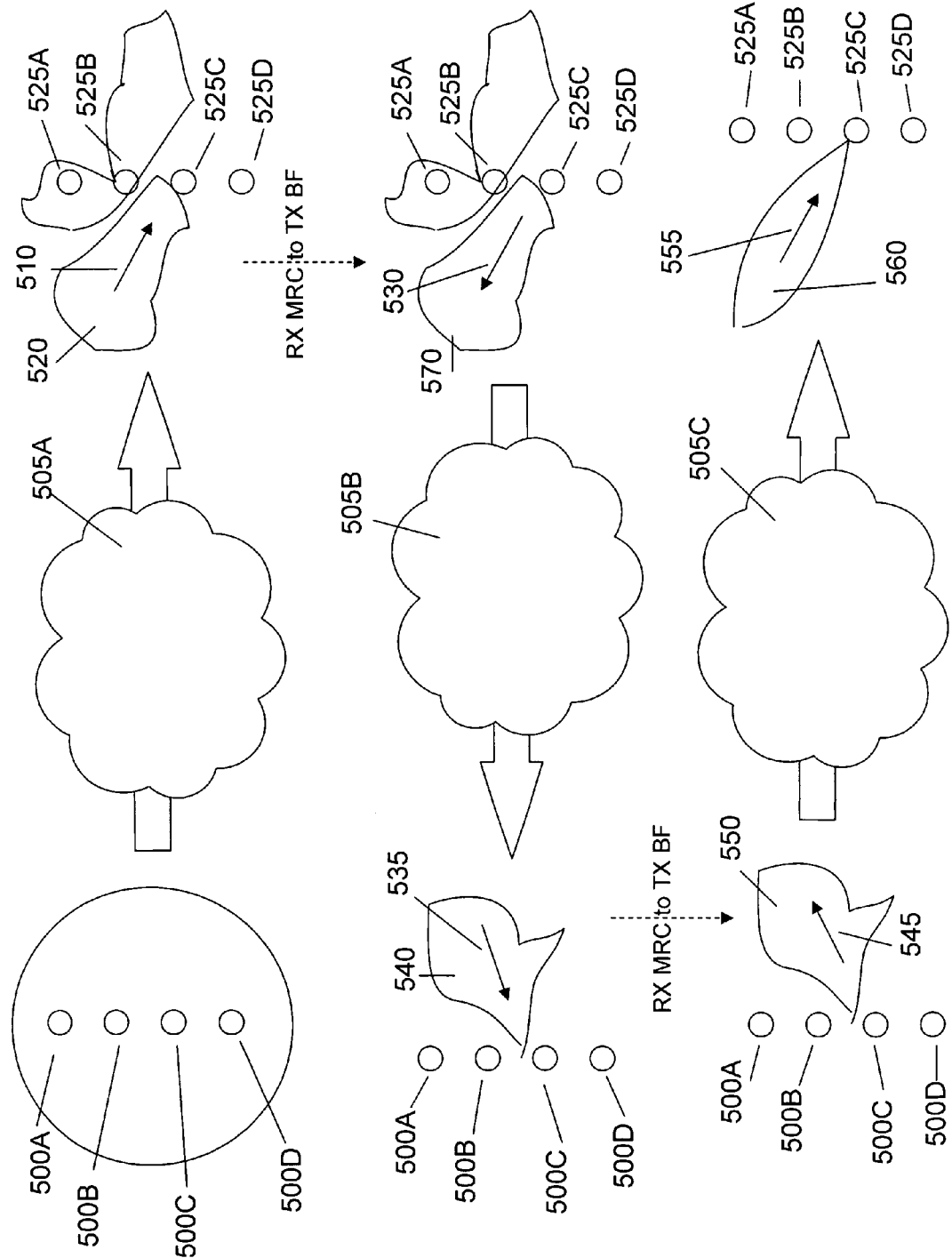
FIG. 6 is a schematic diagram of multiple ping-pong transmissions of multiple data streams.

FIG. 6 provides a non-limiting example of both stations 120, 130 having more than one antenna, while sending one signal at a time. During the initial transmission, transmitting station 120 does not have directional information. The energy scatters from antennas 500A-500D of station 120 omni-directionally. However, that signal arrives at station 130 having been filtered by the characteristics of multipath channel 505A; energy 510 arrives at receive antennas 525A-525D of station 130 from a particular direction. When station 130 pongs back through antennas 525A-525D, it sends energy 530 back in the same direction, so it transmits back in the same direction from which it received energy 520. When energy 530 passes through multipath channel 505B, channel 505B filters even more, such that station 120 receives energy 535 on antennas 500A-500D from the particular direction. Station 120 then turns around and transmits back through multipath channel 505C in the same direction station 120 saw the energy come in. If stations 120, 130 ping-pong back and forth like this, the vectors that are transmitted and received converge to the optimal SVD vectors that correspond to the multipath channel when the ping-pong method is employed.

The reciprocal channel acts like a spatial filter. Energy transmitted in poor propagating directions arrives weakly at the receiver. Energy transmitted in good propagating directions arrives strongly at the receiver. Since the channel is reciprocal, the directions of energy that is received the strongest are also the best directions to transmit. Hence, the receive MRC vectors determine the transmit beamforming vectors.

By ping-ponging, using one beamforming method embodiment, the transmit beamforming vectors converge to the SVD solution. If two or more MIMO signals are ping-ponged, each station 120, 130 forces the second beamforming vector to be orthogonal to the first, the third beamforming vector to be orthogonal to both the first and second, and so on. Orthogonality is a property of SVD beamforming.

One non-limiting example of a method for adjusting the characteristics of the signal is called "Gram-Schmidt Orthogonalization," which is a systematic mathematical technique which allows the creation of a set of orthogonal vectors from a non-orthogonal set. When a data stream is received at station 130, for example, the vectors corresponding to the channel characteristics are determined. If the vectors are orthogonal, they are already in an optimum state and the transmission back and forth between stations 120, 130 can continue. If the vectors are not orthogonal, they are not optimized. If the vectors are not optimized, then a Grahm-Schmidt Orthogonalization may be performed to orthogonalize the vectors. Other mechanism can be used to provide the orthogonalization. The terms "first vector," "second vector," and so on may be used to denote the channel characteristics of a signal. The station sends each data signal (spatial stream) with equal power. The first vector corresponds to the strongest signal received, the second vector corresponds to the next strongest signal received, and so on. The first signal that is received through a multipath channel is the strongest signal. When the second signal is received, the vector that is determined to be the second signal is orthogonalized to the first signal. If a third signal is received, it is orthogonalized to be orthogonal to the first two signals. This process is repeated for as many signals as are received in the transmission.

In one non-limiting example, to determine which signal is the first, the second, or the third, the IEEE 802.11 standard defines a set of bitmaps such that the very first bit map is reserved for the first signal, the second bit map for the second signal, and so forth. After a signal is received by a station, that station transmits back with the first signal on the strongest spatial channel, the second signal on the second strongest spatial channel, the third signal on the third strongest spatial channel, etc. That way, when the stations ping-pong back and forth, each station is using the correct mapping so that the spatial streams will converge properly.

Figure 7B:
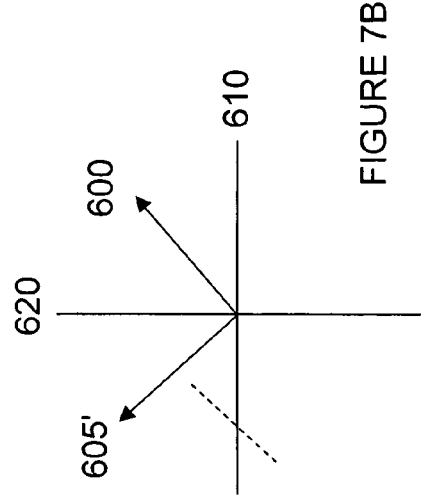
FIGS. 7A-7D are vector diagrams of signal characteristics of data streams transmitted by a MIMO transmitter.
Figure 7D:
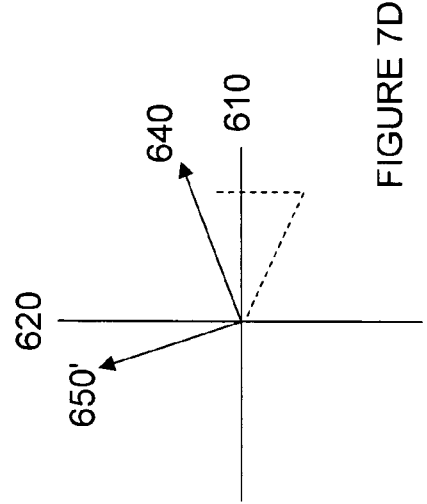
Figure 7A:
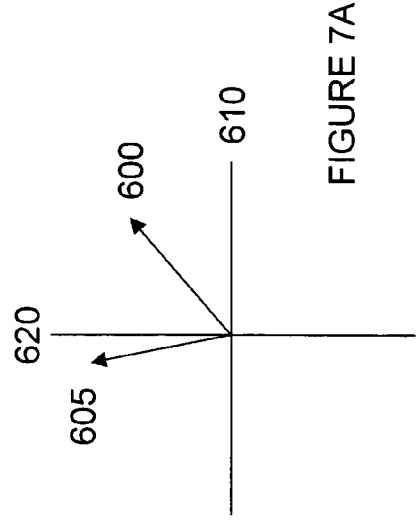

In FIGS. 7A-7D, the vector diagrams of two signals sent between two stations passing through a multipath channel is shown for the ping-pong method. Station 130 corresponds to FIGS. 7A and 7B. Station 120 corresponds to FIGS. 7C and 7D. In FIG. 7A, the station 130 receives two signals with vectors 600, 605 using two antennas. Vectors 600, 605 correspond to the two MRC vectors. The first signal 600, spatial stream 1, appears on a first antenna and a second antenna with equal power. The first axis 610 corresponds to the first antenna; the second axis 620 corresponds to the second antenna. The second signal 605 has relatively less power on the first antenna and more power on the second antenna. If the transmitter of station 120 had used the optimum transmit beam-forming vectors, both signals 600, 605 would have arrived at the receiver orthogonally. Initially, however, station 120 may blindly transmit two signals. Station 130 will receive two signals, but they will not be orthogonal.

Figure 7C:
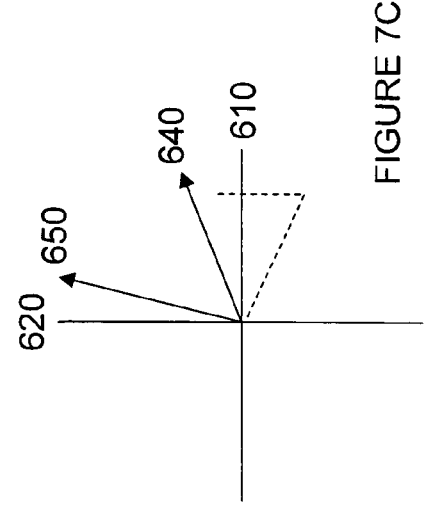

In FIG. 7B, vectors 600, 605' are the transmit beamforming vectors of station 120. The second vector, 605' has been orthogonalized to first vector 600. In response, as shown in FIG. 7C, station 130 receives the transmission from station 120 providing receive MRC vectors, 640, 650 for station 130. Station 130 then transmits beamforms using vectors 640, 650' provided in FIG. 6D in which vector 650' is orthogonalized to vector 640. The transmit vectors equate to the receive vectors, except for the orthogonality. After each ping-pong iteration, the receive vectors become closer to being orthogonal as convergence is approached. A typical convergence may only require a few iterations of the ping-pong method.

Figure 8:
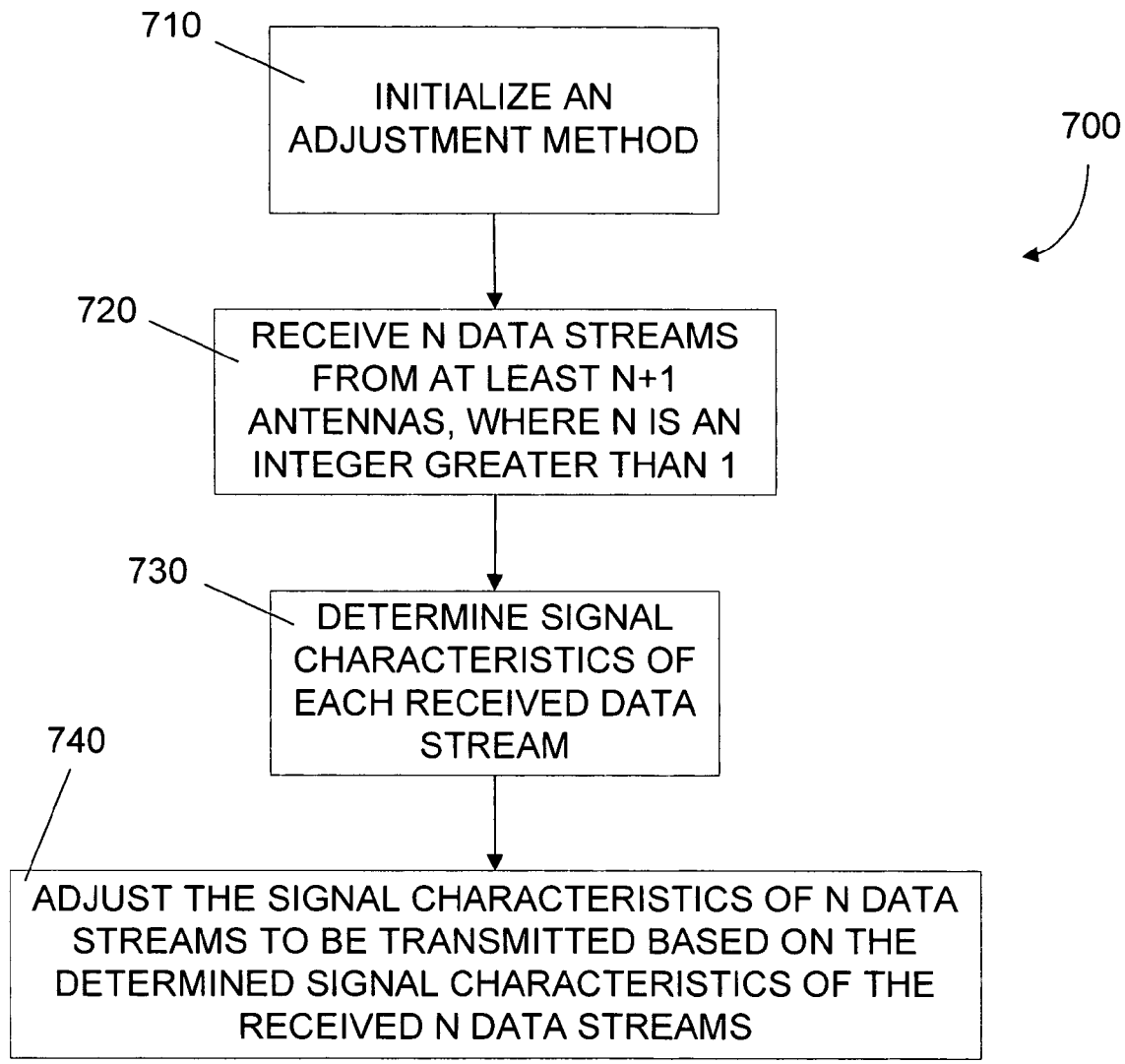
FIG. 8 is a flow diagram of a method for convergence beamforming.

Referring to FIG. 8, in an exemplary embodiment of method of autoconvergence beam-forming 700, in block 710, the first transmission for two or more signals is sent blindly from station 120, which may be referred to as an initialization phase. The initialization phase may include an empty packet sent out blindly, or the initialization phase may include sending the first information packet blindly or omnidirectionally. Alternatively, the signals used in the initialization may be orthogonalized before the initial transmission between the stations. Then, once station 130 receives the first transmission in block 720, in block 730, station 130 determines the signal characteristics of the received signal(s). In block 740, station 130 forces a second signal of multiple signals, which corresponds to the weaker channel, to be orthogonal to the first channel. Then that signal is transmitted back to station 120. This ping-pong operation is continued and the signals converge to the optimum solution, which is orthogonal. This process can be extrapolated to multiple signals, for example, three or four signals. Any method of orthogonalization may be used.

The ping-pong technique described above may be applied directly to OFDM among other methods. It may be applied to both wired and wireless systems. OFDM uses subcarriers (multiple tones). IEEE 802.11a/g OFDM uses 52 subcarriers. Each OFDM subcarrier experiences multipath. This multipath changes the amplitude and phase of the subcarrier before reaching the receive antenna. There is a multipath channel matrix (e.g., 2×4) for each OFDM subcarrier. The ping-pong technique employs the reciprocal transmission of N MIMO signals in both directions with autoconvergence to the SVD Solution. To achieve convergence, in an exemplary embodiment, one station has at least N+1 antennas. However, the other station may have a smaller number of antennas, such as N; both radios do not need N+1 antennas to achieve convergence.

Exemplary embodiments of the present disclosure can be implemented in hardware, software, firmware, or a combination thereof. In the preferred embodiment(s), the beamforming method is implemented in software or firmware that is stored in a memory and that is executed by a suitable instruction execution system. If implemented in hardware, as in an alternative embodiment, the method can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The beamforming method, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method, comprising:
   receiving a plurality of data streams at a plurality of receive antennas associated with a transceiver, wherein the plurality of data streams comprise a first data stream and a second data stream;
   determining at the transceiver first and second receive vectors comprising signal characteristics based on a plurality of received signals associated with the first and second data streams;
   determining a first transmit vector based on the first receive vector;
   determining a second transmit vector based on the first transmit vector and second receive vector;
   mapping at the transceiver a first transmit data stream across a plurality of transmit antennas based on the first transmit vector; and
   mapping at the transceiver a second transmit data stream across the plurality of transmit antennas based on the second transmit vector.

2. The method of claim 1, wherein the signal characteristics of a given data stream comprise the amplitude and phase of the given data stream.

3. The method of claim 1, wherein the first transmit vector is a conjugate of the first receive vector.

4. The method of claim 3, wherein the first receive vector has the largest amplitude of the first receive vector and the second receive vector.

5. The method of claim 3, wherein each of the first and second transmit vectors are each orthogonalized with transmit vectors corresponding to other data streams.

6. The method of claim 1, wherein determining the second transmit vector comprises:
   initializing the second transmit vector to a conjugate of the second receive vector; and
   orthogonalizing the second transmit vector to the first transmit vector.

7. The method of claim 6, wherein orthogonalizing the second transmit vector comprises using a Gram-Schmidt Orthogonalization of the first transmit vector and the second transmit vector.

8. The method of claim 1, further comprising:
   determining a third receive vector comprising signal characteristics of a third data stream;
   determining a third transmit vector based on the third receive vector; and
   mapping a third transmit data stream over the plurality of transmit antennas based on the third transmit vector.

9. The method of claim 1, wherein the data streams comprise time division multiplexed data streams.

10. The method of claim 1, further comprising:
    after mapping the first transmit data stream, transmitting the first transmit data stream using at least one of the plurality of transmit antennas.

11. The method of claim 1, wherein the receiving the data streams comprises receiving the data streams from a second station.

12. The method of claim 11, wherein the first station has a different quantity of antennas than the second station.

13. The method of claim 11, wherein receiving farther comprises receiving at the first station from the second station operating with substantially similar frequencies as the first station.

14. The method of claim 1, wherein the plurality of receive antennas are also used for reciprocal transmission.

15. The method of claim 14, wherein the plurality of transmit antennas comprise the plurality of receive antennas.

16. The method of claim 1, further comprising:
    after mapping the second transmit data stream, transmitting the second transmit data stream using at least one of the plurality of transmit antennas.

17. The method of claim 1, further comprising implementing an initialization phase comprising:
    receiving a single initialization data stream before receiving the data streams;
    determining the signal characteristics of the received initialization data stream; and
    adjusting the signal characteristics of an initialization response data stream to be transmitted to compensate for the determined signal characteristics of the received initialization data stream.

18. The method of claim 1, wherein receiving the data streams comprises receiving the received data streams transmitted using a wireless protocol selected from a list comprising at least one of IEEE 802.11 and Bluetooth.

19. A transceiver, comprising:
    means for receiving a plurality of data streams;
    means for determining first and second receive vectors comprising the signal characteristics of each received data stream based on a plurality of received signals associated with the received data stream;

means for determining a first transmit vector based on the first receive vector;
means for determining a second transmit vector based on the first transmit vector and second receive vector;
means for mapping a first transmit data stream based on the first transmit vector; and
means for mapping a second transmit data stream based on the second transmit vector.

20. The transceiver of claim 19, wherein the single initialization data stream comprises an empty packet.

21. The transceiver of claim 19, wherein the system comprises one of the list comprising at least one of a wireless radio, a laptop, a desktop, a personal digital assistant, and a network device.

* * * * *

UNITED STATES PATENT AND TRADEMARK OFFICE
CERTIFICATE OF CORRECTION

PATENT NO. : 7,627,286 B2 Page 1 of 1
APPLICATION NO. : 11/410707
DATED : December 1, 2009
INVENTOR(S) : Webster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Second Day of November, 2010

David J. Kappos
*Director of the United States Patent and Trademark Office*